Aug. 18, 1942.       H. A. THORNDIKE       2,293,479
OIL SEAL
Filed Feb. 1, 1941
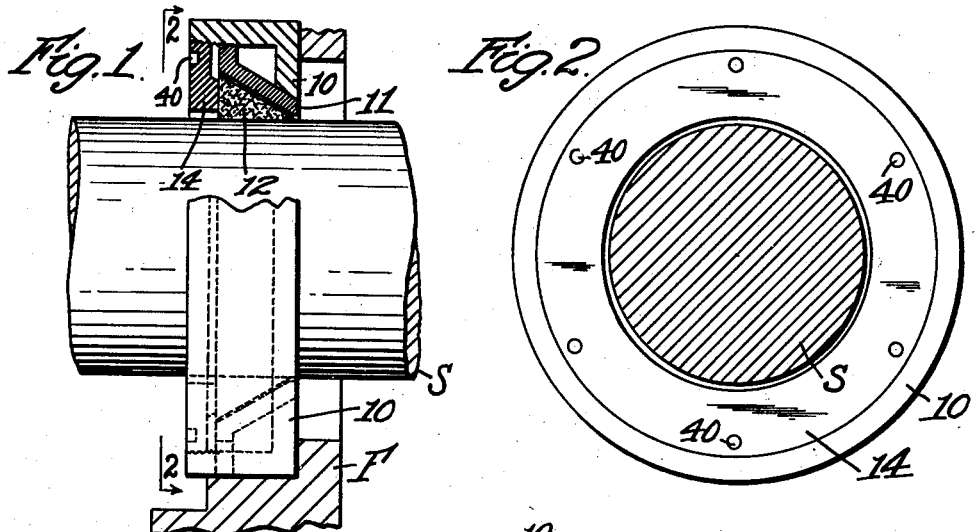
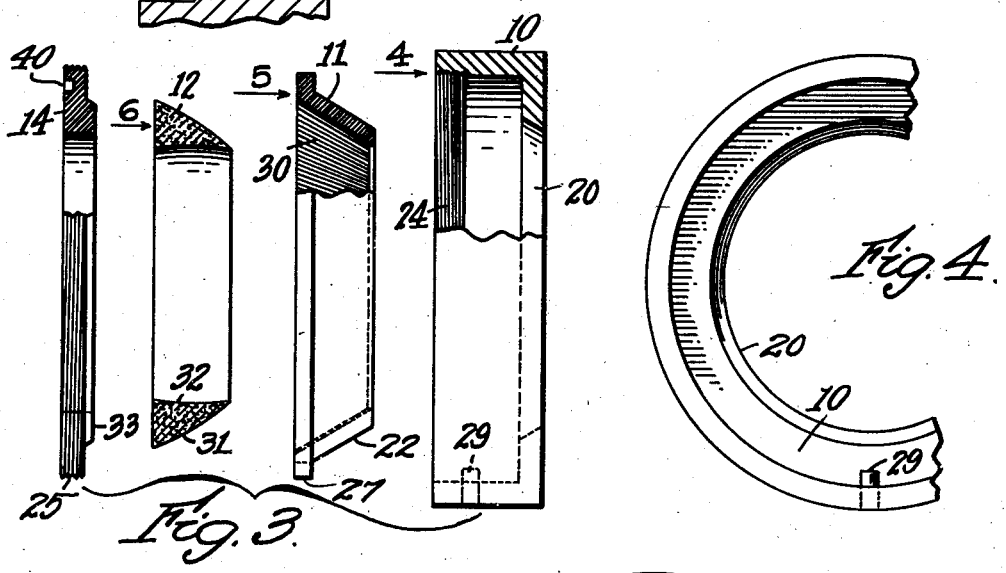
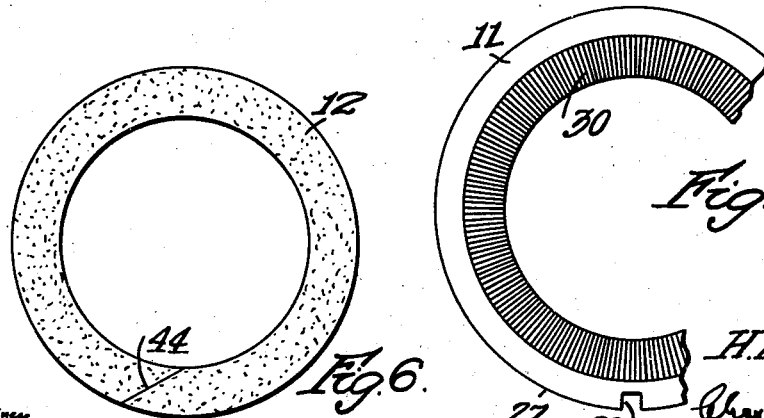
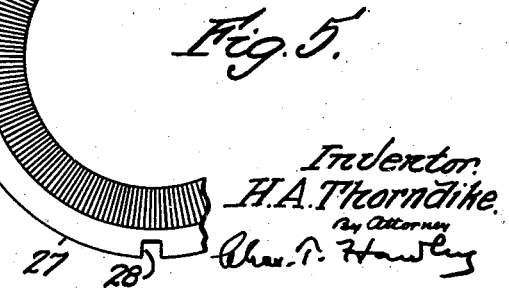
Inventor:
H. A. Thorndike Patented Aug. 18, 1942

2,293,479

UNITED STATES PATENT OFFICE 2,293,479

OIL SEAL

Herbert A. Thorndike, Oshkosh, Wis.

Application February 1, 1941, Serial No. 377,009

2 Claims. (Cl. 288—3)

This invention relates to an oil seal designed to prevent leakage from an oil casing or chamber outward along a rotating shaft. Such oil seals are widely used in automobiles and have many important additional uses.

It is the general object of my present invention to improve and simplify the construction of oil seals as heretofore known, and particularly to provide an oil seal in which the annular sealing element or packing may be conveniently removed and replaced.

My improved oil seal comprises few and simple parts which may be easily and economically manufactured and which may be quickly assembled for use.

My invention further relates to arrangements and combinations of parts which will be hereinafter described and more particularly pointed out in the appended claims.

A preferred form of the invention is shown in the drawing, in which

Fig. 1 is a side elevation, partly in section, showing my improved oil seal mounted on a rotatable shaft;

Fig. 2 is a side elevation of the oil seal, with the shaft in section, and taken along the line 2—2 in Fig. 1;

Fig. 3 is an exploded side elevation of the several elements of my improved oil seal, partly in section;

Fig. 4 is a partial side elevation of the outer casing, looking in the direction of the arrow 4 in Fig. 3;

Fig. 5 is a partial side elevation of a packing retainer, looking in the direction of the arrow 5 in Fig. 3; and Fig. 6 is a side elevation of an annular packing, looking in the direction of the arrow 6 in Fig. 3.

Referring to the drawing, my improved oil seal comprises a casing 10, a retainer 11, an annular packing 12 and a clamping ring 14. The casing 10 is to be mounted in fixed position in a suitable supporting structure or frame, indicated at F in Fig. 1 and in itself forming no part of my present invention. I have also shown my improved seal as applied to a rotating shaft S and preventing leakage axially therealong.

The fixed casing 10 has an opening 20 (Fig. 3) having a beveled side wall to receive the conical portion 22 of the retainer 11. The casing 10 is also threaded as indicated at 24 to receive the threaded outer portion 25 of the clamping ring 14.

The retainer 11 has an outer flange 27 loosely fitting within the casing 10, and the flange 27 is notched at 28 (Fig. 5) to receive a pin 29 (Figs. 3 and 4) in the side wall of the casing 10. The retainer is thus firmly held from rotation within the fixed casing 10.

The inner face of the retainer 11 presents a fluted or corrugated conical surface 30 which is engaged by the outer surface 31 of the packing 12 when the parts are assembled. The corrugated surface then prevents rotation of the packing with the shaft S and relative to the retainer 11.

The packing 12 is of substantially triangular cross section, with the inner surface 32 preferably slightly concave and with the outer surface 31 slightly convex.

The clamping ring 14 has an inner annular projecting portion 33 which engages the outer face of the packing 12 and forces the packing axially along the conical corrugated surface of the retainer 11 as the ring 14 is screwed into the casing 10.

When the packing is thus forced into the retainer, the inner and outer walls of the packing will be straightened and the edges will firmly engage the rotating shaft S. Holes 40 in the ring 14 are adapted to receive a suitable spanner for tightening the ring in the casing 10.

As the packing 12 wears, the ring 14 may be further tightened to maintain an oil-tight fit of the packing on the shaft S. When it is desired to replace the packing after more extended wear, the ring 14 is unscrewed and removed axially and the packing 12 can then be easily taken out and replaced by a new packing.

If the oil seal is mounted between bearings or is otherwise so mounted on the shaft that the packing cannot be removed and replaced by axial movement, the annular packing may be slit as indicated at 44 in Fig. 6, so that it may be removed from the shaft or replaced by radial instead of axial movement. When a slitted packing is thereafter firmly clamped in the retainer 11, the slit 44 will be closed and no leakage through the slit will occur.

I thus provide an extremely simple oil seal which is very easily assembled or adjusted for wear, and in which the clamping ring 14 is the only relatively movable part. I also entirely avoid the use of springs or any other elements which could be easily broken or which might get out of order. Avoidance of springs is desirable, as the acids frequently found in lubricating oils have a tendency to rust the springs, with subsequent breakage when in use.

The packing 12 may be of any suitable material, such as leather, rubber, plastic material or fiber, but in most cases leather is found generally satisfactory.

Prevention of rotation of both the retainer 11 and the packing 12 with the shaft S is particularly important, as satisfactory sealing of a rotating shaft cannot be accomplished if either of these parts is allowed to rotate.

Having thus described my invention and the advantages thereof, I do not wish to be limited to the details herein disclosed, otherwise than as set forth in the claims, but what I claim is:

1. An oil seal for a rotated shaft comprising a fixed annular casing having one internally-threaded open end and having a radially-disposed inwardly-projecting end flange at the other end with a conical opening therein concentric with said shaft but substantially spaced therefrom, a removable packing retainer having conical inner and outer surfaces and having a radially-disposed outwardly-projecting end flange, said conical outer surface engaging the conical opening in the fixed casing end flange, and said retainer end flange fitting within said casing, whereby said retainer is accurately centered in said casing and held concentric with said shaft, coacting means on said casing and retainer effective to hold said retainer from rotation in said casing, an annular packing substantially triangular in cross section and mounted in said retainer and surrounding said shaft, and a clamping ring threaded in the open end of said casing and effective to compress said packing into the converging space between said retainer and said shaft and to center said retainer with said conical opening, said annular packing being easily removable and replaceable axially relative to said retainer and casing when said clamping ring is axially separated from said casing.

2. An oil seal as set forth in claim 1, in which the annular packing has a slightly concave inner surface and a slightly convex outer surface and thereby more effectively engages the shaft on which the oil seal is mounted, when said packing is compressed in said retainer.

HERBERT A. THORNDIKE.